Aug. 31, 1954     K. B. PERSSON     2,688,084
DEVICE FOR THE GENERATION OF HIGH-FREQUENCY OSCILLATIONS
Filed Feb. 27, 1948
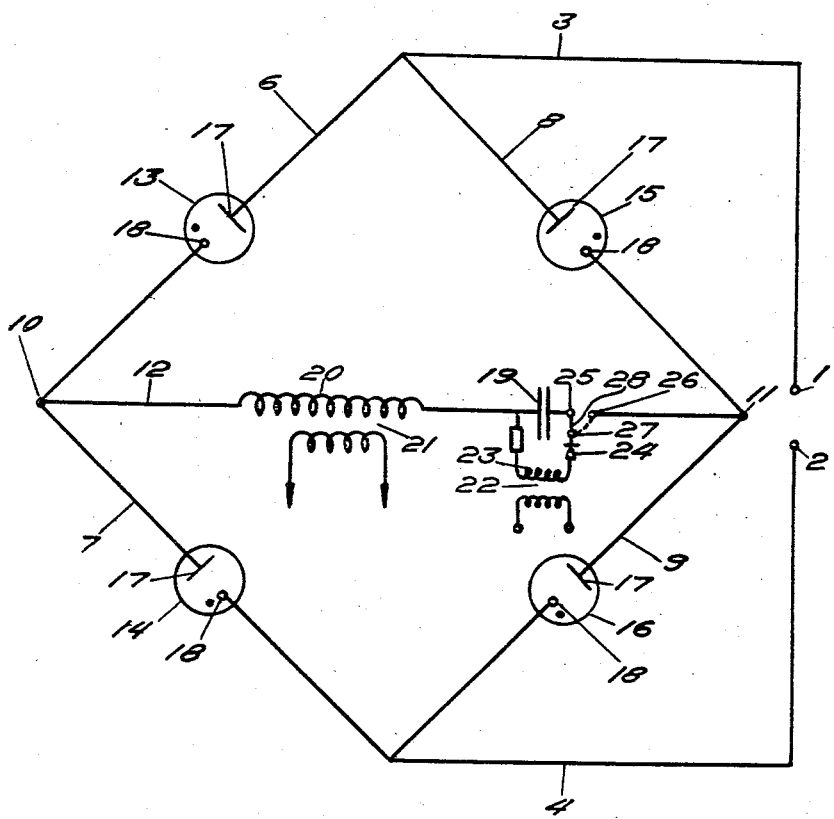
Inventor:
K. B. Persson Patented Aug. 31, 1954

2,688,084

UNITED STATES PATENT OFFICE 2,688,084

DEVICE FOR THE GENERATION OF HIGH-FREQUENCY OSCILLATIONS

Karl Birger Persson, Stockholm, Sweden, assignor to Lumalampan Aktiebolag, Stockholm, Sweden Application February 27, 1948, Serial No. 11,658
In Sweden September 2, 1946

Section 1, Public Law 690, August 8, 1946
Patent expires September 2, 1966

3 Claims. (Cl. 250—36)

This invention relates to a device for the generation of high frequency oscillations by means of direct current or, if required, alternating current of lower frequency. In the device designed the direct current or alternating low frequency current is supplied to two circuits connected in parallel, each of which by means of a capacitive connection, which serves as a bridge, is divided in pairs of branches, designed to permit direct current to pass through, and each of them containing a unidirectional gas discharge tube so arranged that the tubes in the circuits connected in parallel are turned in one and the same direction. By unidirectional gas discharge tubes is to be understood rectifier tubes, thyratrons and similar discharge tubes, which have an activated cathode and a non-activated anode, and which permit current to pass in one direction only, thus stopping it in the opposite direction.

The oscillator connecting arrangement referred to will now be described in detail in connection with the diagram enclosed herewith.

In the diagram points 1 and 2 are the terminal points of the source of supply (direct current or low frequency alternating current supply). These terminal points 1 and 2 are by means of conductors 3 and 4 connected to the terminal points of two mutually parallel circuits 6, 7 and 8, 9. The midpoints 10 and 11 of these circuits are bridged over by means of circuit 12. Bridge 12 divides the parallel circuits in pairs of branches 6, 7 and 8, 9 respectively, and in each of the branches formed in this way is included a unidirectional discharge tube 13, 14, 15 and 16. The tubes in the two parallel circuits 6, 7 and 8, 9 are arranged in one and the same direction, looking from terminal points 1 and 2, so that cathode 18 and anode 17 in the corresponding tubes in regard to direct current lie in the same way in all branches 6, 7 and 8, 9 respectively. According to the invention, branches 6, 7, 8 and 9 are designed to permit direct current to pass through, whereas in bridge 12 a capacitance 19 is arranged in series connection. The oscillator arrangement contains also one or several inductances; in the figure the inductance has been arranged in the bridge as an impedance 20.

The four unidirectional discharge tubes forming part of the oscillator serve to reverse the poles of capacitor 19 in relation to the source of direct current, so that the direct current can pass through the device transformed into alternating current, which, according to the figure, for instance may be taken out through transformer connection 21. Polarity is changed for every half period of the alternating current, the frequency of which is dependent upon the dimensions of the components used in the arrangement. The tubes are designed to be influenced only by the charge swinging in the capacitor and therefore have a striking voltage, which exceeds the voltage of the source of supply. In order to make the tubes strike and the circuit arrangement to generate alternating current, the capacitor must be charged. The figure shows a starting device suitable for this purpose. It consists of a transformer 22 fed with alternating current, the secondary winding 23 of this transformer being arranged in parallel through capacitor 19. In the connecting circuit of the secondary winding is included a rectifier 24 and a switch for connecting the secondary winding 23 through the capacitor and for breaking the connection mentioned. At the same time as the switch closes the charging circuit of capacitor 19 it shall break the bridge circuit 12 in the oscillator arrangement, and vice versa: when breaking the charging circuit, it shall close the bridge 12. Therefore, the switch is shown as an arm 28 revolving about a connection point 25 between connection points 26 and 27, which when closing of the connection points 25 and 26 is effected will close the bridge charge 12, and when closing of connection points 25 and 27 is effected will close the charging circuit for the capacitor.

In the diagram switch 25 is shown in the latter position for charging capacitor 19, which thereby is charged with a voltage, which is at least twice the striking voltage of the discharge tubes. When breaking the charging circuit and closing the bridge circuit, the capacitor discharges through one of the following circuits: 6, 12, 9 or 7, 12, 8, and that is the circuit, in which the anodes of tubes 13, 16 or 14, 15 respectively are connected to the positive electrode of capacitor 19. This causes the tubes arranged in this circuit to strike, their anodes being at a positive potential in relation to the cathodes, while at the same time the negative electrode of the capacitor is connected to the positive pole of the supply source, as also the positive electrode of the capacitor is connected to the negative pole of the source of supply. When the capacitor discharges down to zero voltage, inductance 20 receives so much energy that it is capable of charging capacitor 19 to a somewhat higher voltage to begin with, and in continuation condition to a voltage as high as the original voltage through the capacitor, but in the opposite direction. During this entire process the current goes in the same direction in the circuit. When the above mentioned charging of the capacitor in the opposite direction is effected, the current has dropped down to zero, which will extinguish the tube so far in operation. The capacitor will now discharge through the pair of tubes, which are part of the other of the above mentioned circuits, during which discharge the process described is repeated, but in the opposite direction, etc.

Specifically the operation of the system, and the function of the device is as follows: Terminal 1 is positive with respect to terminal 2 and the right hand plate of condenser 19 is positive. In path 7, 12, 8 the condenser charge and supply voltage are bucking each other, while in path 6, 12, 9 the voltages are additive. In the additive path 6, 12, 9 it is assumed the potential is sufficient to render the tubes 13 and 16 conductive (to strike). Under conduction condenser 19 discharges and inductance 20 effects a continuance of current flow in the same direction until condenser 19 is so reversely charged that tubes 13 and 16 are then cut off. At this point there is an additive path 7, 12, 8 effecting the conduction of tubes 14, 15, to charge condenser 19 in a reverse direction which is like the original charge. The method is continued whence oscillations may then be derived from 21.

So the device functions automatically as a converter. The frequency of this generator is solely determined by oscillation circuit 19, 20, and the losses are only those occurring in the inductance and source of voltage. If V represents the voltage of the source of direct current and $V_f$ is the drop of voltage in a valve tube, the efficiency will be:

$$\eta = \frac{V - 2V_f}{V}$$

in other words: with a direct current of 220 v. and a thyratron with as high voltage drop as 15 v. an efficiency of 95% is obtained, which is much better than the efficiency of present day oscillators, the efficiency of which lies in the neighbourhood of 50 to 60%. In this connection allowance has not been made for losses in the capacitor and inductance, which, however, are of minor importance than the loss in the valve tubes. Therefore, an efficiency of 90% may always be depended upon.

The requirements, which the valve tubes must comply with, may be summarized as follows: They must have a low voltage drop as compared with the direct current voltage supplied and must be capable of letting very large currents pass through. They must permit current to pass through only in one direction and shall completely stop the passing of current in the opposite direction. It is desirable that they close and break the circuit instantly in relation to the frequency, which the oscillator shall give. This means they must practically be free from inertia, at least in respect of the frequency, at which they have to work. The requirements specified are on the whole met by present day thyratrons. It is not essential, however, to use such a tube, as strictly a modified rectifier without a grid is sufficient.

With regard to the frequency, it may be said that it is the deionization time of the valve, which will determine its upper limit. Thyratrons have hitherto often been used for generating saw tooth oscillations, and it has been possible to come up to frequencies as high as 600,000 cycles per second. There is reason to believe that the upper limit can be raised still more by special arrangements. The thyratrons available permit, however, the generation of frequencies within the range 100,000–500,000 per second with the oscillator recommended.

The connection arrangement may be varied, for instance by dividing the inductance and placing it in the arms of the bridge connection. The risk of short-circuiting through tubes 13, 14 or 15, 16 respectively is hereby eliminated. The branches 6, 7 and 8, 9 respectively are, as will be noted, without current limiting elements situated above the source of supply, so that there is a certain risk for short-circuiting of the latter in the case of faulty ignition in one of the tubes.

What I claim is:

1. A device for generating high frequency electrical oscillations by means of a current comprising a circuit to which said current is fed, said circuit having two parallel branches, a connection forming a bridge between said parallel branches, a chargeable capacitance in said connection, said branches having four arms arranged to permit transmission of direct current, a unidirectional discharge tube in each said arm having a striking voltage exceeding the voltage of the source of supply, said tube in all said arms lying in one and the same direction in regard to the transmission of a direct current, the circuit arrangement comprising two Z-formed current paths for transmission of a charge imparted to the capacitance of the current fed to the device, each said path comprising the said connection including said capacitance and two said branch arms and being connected to different ends of said connection, the voltage of said capacitance being added to the voltage of the current supply in said current paths, an inductance in each said current path, the inductance in one path being equivalent to the inductance in the other path, and output means for the generated high frequency oscillations.

2. A device for generating high frequency electrical oscillations by means of a current comprising a circuit to which said current is fed, said circuit having two parallel branches, a connection forming a bridge between said parallel branches, a capacitance in said connection, means for charging said capacitance, said branches having four arms arranged to permit transmission of direct current, a unidirectional discharge tube in each said arm having a striking voltage exceeding the voltage of the source of supply, said tubes in all said arms lying in one and the same direction in regard to the transmission of a direct current, the circuit arrangement comprising two Z-formed current paths for transmission of a charge imparted to the capacitance of the current fed to the device, each said path comprising the said connection including said capacitance and two said branch arms and being connected to different ends of said connection, the voltage of said capacitance being added to the voltage of the current supply in said current paths, an inductance in each said current path, the inductance in one path being equivalent to the inductance in the other path, and output means for the generated high frequency oscillations.

3. A device for generating high frequency electrical oscillations by means of a current comprising a bridge circuit to which said current is fed, said circuit comprising four side branches and a capacitance connection extending over a diagonal of the bridge circuit, said branches being arranged to permit transmission of direct current and each containing a uni-directional discharge tube having a striking voltage exceeding the voltage of the source of supply, said tubes in all said branches being turned in one and the same direction in regard to the transmission of a direct current, the current arrangement for transmission of a charge imported to the capacitance comprising two Z-current paths, each said path consisting of the capacitance connection and two branches each connected to different ends of the capacitance connection and each having a discharge tube, the capacitance voltage being added to the voltage of the current source over said current paths and an inductance in the respective current paths, the inductance in one path being equivalent to the inductance in the other path.

References Cited in the file of this patent

UNITED STATES PATENTS

| Number | Name | Date |
|---|---|---|
| 2,088,490 | Slepian | July 27, 1937 |
| 2,247,728 | Langer | July 1, 1941 |
| 2,287,542 | Vang | June 23, 1942 |
| 2,390,659 | Morrison | Dec. 11, 1945 |

FOREIGN PATENTS

| Number | Country | Date |
|---|---|---|
| 127,127 | Sweden | Nov. 10, 1949 |
| 422,186 | Great Britain | Oct. 7, 1933 |